(12) United States Patent
Levy et al.

(10) Patent No.: US 7,987,249 B2
(45) Date of Patent: Jul. 26, 2011

(54) SOFT SYSTEM FAILURE RECOVERY FOR MANAGEMENT CONSOLES SUPPORTING ASF RMCP

(75) Inventors: Omer Levy, Jerusalem (IL); Gidi Etzion, Jerusalem (IL); Dan Abramsky, Maoz Tsion (IL)

(73) Assignee: Intel Corporation, Santa Clara, CA (US)

( * ) Notice: Subject to any disclaimer, the term of this patent is extended or adjusted under 35 U.S.C. 154(b) by 2962 days.

(21) Appl. No.: 10/410,941

(22) Filed: Apr. 9, 2003

(65) Prior Publication Data
US 2004/0205177 A1    Oct. 14, 2004

(51) Int. Cl.
*G06F 15/173* (2006.01)
(52) U.S. Cl. ........................ 709/223; 709/224
(58) Field of Classification Search ............. 709/224; 714/43
See application file for complete search history.

(56) References Cited

U.S. PATENT DOCUMENTS

| | | | |
|---|---|---|---|
| 2002/0152429 A1* | 10/2002 | Bergsten et al. | 714/43 |
| 2003/0028633 A1* | 2/2003 | Lindsay et al. | 709/224 |

OTHER PUBLICATIONS

Alert Standard Format Specification, Aug. 14, 2002, 98 pgs, DSP0136 version 2.0.j, Distributed Management Task Force, Inc.

* cited by examiner

*Primary Examiner* — Karen C Tang
(74) *Attorney, Agent, or Firm* — Schwabe, Williamson & Wyatt, P.C.

(57) ABSTRACT

A management console in support of RMCP with RSP is provided with an enhanced management session create function that determines whether the creation of a management session with a managed remote client is being performed following a system failure, and to orchestrate a soft recover, on so determining. In one embodiment, the soft recovery includes sending an authenticated message to the managed remote client, using certain persistently saved session data of a prior open management session with the managed remote client, with the authenticated message being sent in a manner that circumvents the anti-replay protection mechanism of RSP.

29 Claims, 3 Drawing Sheets

SOFT SYSTEM FAILURE RECOVERY FOR MANAGEMENT CONSOLES SUPPORTING ASF RMCP

BACKGROUND OF THE INVENTION

1. Field of the Invention

The present invention relates to the field of network management. More specifically, the present invention relates to system failure recovery for management consoles, in particular, management consoles in support of Alert Standard Format (ASF) Remote Management and Control Protocol (RMCP), including its related Security Extension Protocols (RSP).

2. Background Information

Advances in integrated circuit and microprocessor technologies have led to wide spread deployment and adoption of computing devices. Examples of computing devices include servers, personal computers and "special" purpose computing devices. Personal computers may have form factors, such as desktop, laptop, tablet, and so forth. Overtime, maintenance of large number of sophisticated computing devices has become increasingly difficult.

Concurrently, advances in networking and communication related technologies have led to increased interconnection between computing devices, and deployment of networked client/server applications, across private and/or public networks, such as the Internet. As a result, advances were made in remotely managing client computing devices across one or more networks.

Among the numerous advances is ASF, a standardized format to enable remote system access and control of managed clients in both operating system (OS) present and OS-absent environments.

ASF includes various protocols, such as PET (Platform Event Trap) and RMCP, which are used by the managed clients to report the aforementioned managed clients state information, and for the management console to remotely control the managed clients, responsive to the reported state information. The reporting and management may be performed in either an OS present or an OS absent mode. RMCP has been extended to include various security related protocols, collectively referred to as RSP, to facilitate authenticated communication between managed clients and the management console. For further information, see e.g. Alert Standard Format (ASF) Specification V2.0.

Since under RMCP, a managed client is to be manageable even without the operating system, as a result, the OS absent portion of the client side implementation of support for RMCP (including RSP) is typically implemented in hardware. However, the hardware implementation typically has sufficient resources only for one management session. Such a management session typically has certain session data, e.g. a session identifier and a session key, associated with it. As part of RSP, a management console is required to present the proper session data, e.g. the session key, to conduct authenticated communication with a managed client.

As a result, if a management console encounters a system failure (also referred to as a system crash, or simply crash), and loses the current relevant session data of a management session of a managed client, the management console is unable to further communicate with the managed client. Since session closure is an operation, which RSP defines to be authenticated communication, the session can not be closed. Establishment of a new session in parallel is not an option, since as earlier described, typically a managed client in support of RMCP, supports only one open management session.

Thus, a soft system failure recovery approach for a management console in support of ASF RMCP with RSP is desired.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes management console equipped to support RMCP with RSP with soft system failure recovery.

In the following description, various configurations will be described, to provide a thorough understanding of the present invention. However, the present invention may be practiced without some of the specific details or with alternate storage elements and/or combinatorial logics. In other instances, well-known features are omitted or simplified in order not to obscure the present invention.

The description to follow repeatedly uses the phrase "in one embodiment", which ordinarily does not refer to the same embodiment, although it may. The terms "comprising", "having", "including" and the like, as used in the present application, including in the claims, are synonymous.

Figure 1:
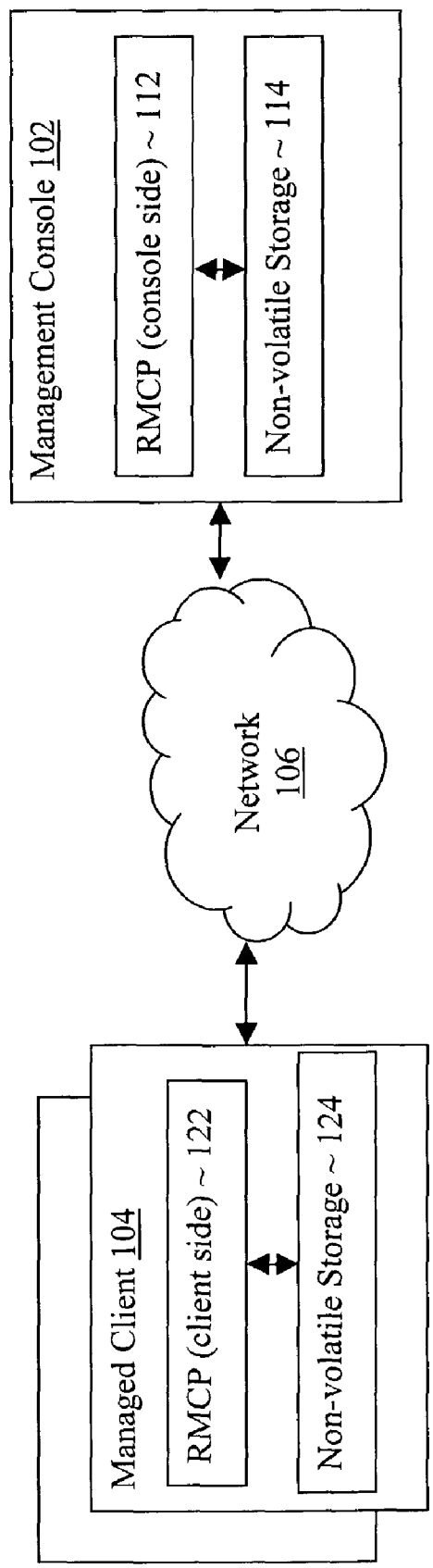
FIG. 1 illustrates an environment within which the present invention may be practiced, in accordance with one embodiment.

Referring now to FIG. 1, wherein a block diagram illustrating an overview of the present invention in accordance with one embodiment, is shown. As illustrated, managed remote clients 104 and management console 102 are coupled to each other via network 106. Managed remote clients 104 (hereinafter, simply managed clients) and management console 102 are equipped with the client side and the server (console) side implementation of support for RMCP 122 and 112. For the embodiment, the RMCP support includes RSP. Resultantly, management console 102 may manage managed clients 104 across network 106 in accordance with RMCP, including RSP.

As will be described in more detail below, console side implementation of support for RMCP with RSP 112 (hereinafter simply, console side implementation) is advantageously enhanced to facilitate soft system failure recovery. More specifically, console side implementation 112 is enhanced to determine, on receipt of a request to create a RSP management session (hereinafter simply, management session) for a managed client 104, whether the management session creation for the managed client 104 is being requested following a catastrophic system failure (crash). On determining that the management session creation for the managed client 104 is requested following a system crash, console side implementation 112 would advantageously orchestrate a soft system recovery, overcoming the deadlock under the prior art, where management console 102 is unable to communicate with a managed client 104 with a prior open management session, close the prior open management session or open a new management session.

Still referring to FIG. 1, managed clients 104 and management console 102 are each provided with non-volatile storage 124 and 114. Examples of non-volatile storage include but are not limited to hard disks, and Electrically Erasable Read Only Memory (EEPROM). Among other data, non-volatile storage 124 and 114 are employed to store long term keys for the generation of session keys for RSP management sessions.

More importantly, for the illustrated embodiment, non-volatile storage 114 is further employed to store at least the relevant session data, such as session identifier and the session key, of each management session of a managed client 104. These session data are relevant as they are required to conduct authenticated communications, i.e. the successful sending of authenticated messages, with managed clients 104 during a management session.

That is, console side implementation 112 is also enhanced to store a copy of these relevant session data of a management session of a managed client 104, upon opening/establishing the management session with a managed client 104, thereby making these relevant session data of a management session of a managed client 104 available even after a catastrophic system failure, and loss of these data stored in volatile storage (not shown) of management console 102.

Data storage, including the storage of the persistent copy of the relevant session data may be performed using any one of a number of data structures and organizations known or to be designed.

Typically, the management session is opened/established upon request to conduct RMCP communication in a secured manner, and on conclusion of the discovery process in accordance with RSP between management console 102 and a managed client 104.

Additionally, console side implementation 112 is enhanced to delete the persistent copy of the above described relevant session data of a management session of a managed client 104, upon closure of the management session with the manage client 104. A management session may be closed for any one of a number of reasons, e.g. on completion of a series of management operations.

Further, console side implementation 112 is enhanced to leverage on the availability of the persistent copy of the relevant session data of a management session of a managed client 104, and employ them to determine whether a management session creation is being performed following a crash, based at least in part on the existence of the persistently stored relevant session data of a prior open management session.

As will be described in more detail below, console side implementation 112 is also enhanced to automatically effectuate closure of the prior open management session, and re-establishes a new management session with the managed client 104, on determining that the management session creation is being performed following a crash, thereby overcoming the above described prior art deadlock.

Except for the additional advantageous usage of non-volatile storage 114, and the enhancements provided to console side implementation 112, managed clients 104 and management console 102, including the basic functions of client and console side implementations of RMCP support 122 and 112 and non-volatile storages 124 and 114, and network 106, are known in the art, and the present invention may be practiced with a wide range of known or to be designed components, devices and systems.

For example, managed clients 104 may be one or more computing devices selected from known or to be designed networking enabled desktop computers, laptop computers, tablet computers, palm-sized computers, personal digital assistants (PDA), set-top boxes, wireless mobile phones, and so forth.

Likewise, management console 102 may be a compute device selected from known or to be designed networking enabled desktop computers, laptop computers, tablet computers, palm-sized computers, personal digital assistants (PDA), and so forth.

Network 106 may be private, public, or combination thereof. Network 106 may also be wire based, wireless, or combination thereof.

Console side implementation 112 of RMCP support, including RSP, may be practiced using any one of a number of programming languages known in the art, including but not limited to C, C++, and so forth. The implementation may be distributed via any one of a number of distribution medium, such as diskettes, tapes, CD, DVD and so forth, or through any one of a number of channels, such as a distribution server, and so forth.

Client side implementation 122 of RMC support, including RSP, may be effectuated e.g. in firmware.

Thus, except for the enhancements provided to console side implementation 112, these elements will not be otherwise further described.

Figure 2:
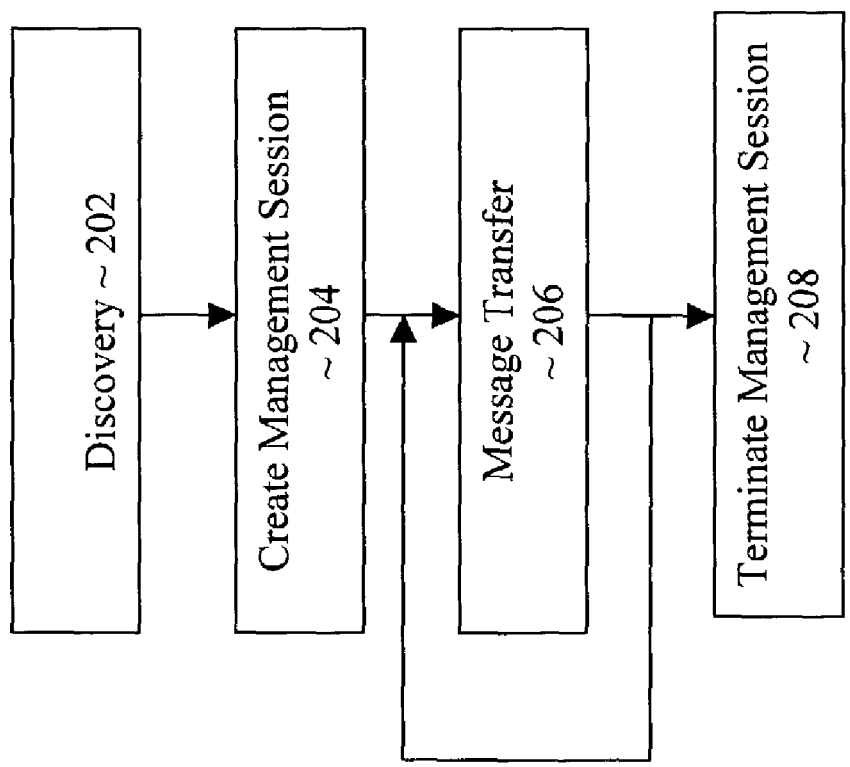
FIG. 2 illustrates the operational flow of the relevant aspects of the management console of FIG. 1, in accordance with one embodiment.

FIG. 2 illustrates the operational flow of the relevant aspects of console side implementation 112, including enhancements incorporated in accordance with one embodiment of the present invention.

As shown, on request to create a management session, e.g. in response to a need to send a secure RMCP message to a managed client 104, console side implementation 112, more specifically, for the embodiment, a discovery function of console side implementation 112, is given control to establish an association with managed client 104 in accordance with the RSP discovery phase protocol, block 202.

If the attempt to establish an association with managed client 104 is not successful, the management session creation process is aborted.

Upon successful establishment of an association with managed client 104, console side implementation 112, more specifically, for the embodiment, a management session creation function, is given control to create a management session with managed client 104, block 204.

The management session creation function is enhanced to be able to soft recover, and overcome the prior art deadlock, even if the management session creation is requested following a system failure, with the managed client 104 still having a prior open management session, to be described more fully below.

Further, also as earlier described, as part of the management session creation process, the relevant session data required to conduct authenticated communication with manage client 104 are established, and saved (for subsequent system failure determination and recovery use).

In one embodiment, the relevant session data include a session key, generated using the long term key, and a session identifier.

Upon successful establishment of the management session, for the embodiment, control is transferred to a messaging function of console side implementation 112 to handle the secure sending and receiving of authenticated communication with client 104, block 206.

On completion of a series of management operations with managed client 104, for the embodiment, control is transferred to a management session termination function to terminate the management session, block 208.

For the embodiment, termination of the management session includes deletion of the persistently stored copy of the relevant session data from non-volatile storage 114.

Figure 3:
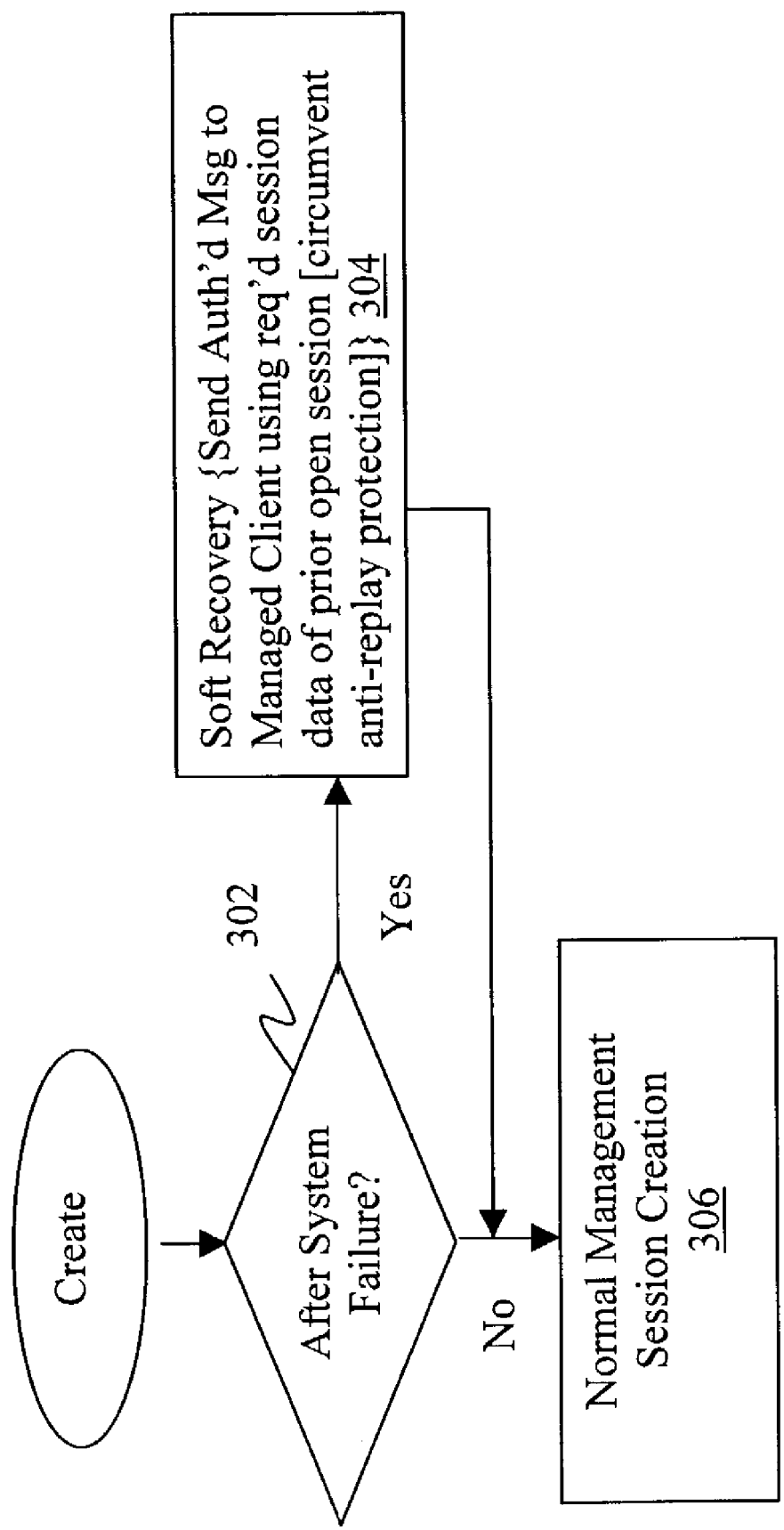
FIG. 3 illustrates the operational flow of the relevant aspects of the management session creation logic of the management console, in accordance with one embodiment.

FIG. 3 illustrates the operational flow of the soft recovery process of the present invention in further detail, in accordance with one embodiment. The process will be described in the context of the earlier described console implementation 112 having a management session creation function, a messaging function, and a management session termination function handling management session creation, messaging and management session termination respectively. In alternate embodiments, these functions may be implemented using more or less functional units.

As described earlier, upon given control, the management session creation function determines whether the management session creation request is being made after a system failure, block 302.

For the embodiment, the management session creation function makes the determination by accessing data stored in non-volatile storage 114 and determines whether the data stored therein include the relevant session data of a prior open management session of the managed client 104.

If the returned data does not contain the relevant session data of a prior managed session of the managed client 104, the management session creation function concludes that the management session creation is not being performed following a crash, and proceeds to complete the management session creation as normal, block 306.

However, If the returned data contain the relevant session data of a prior open management session of the managed client 104, the management session creation function, in lieu of creating a new management session, causes the management session that is still open on managed client 104 (but closed on management console 102 due to system failure), to be "continued".

In one embodiment, the management session creation function effectuates the continuation by causing an authenticated message to be sent to the managed client 104, block 304. For the embodiment, the authenticated message is sent using the relevant session data of the prior open management session.

Further, the authenticated message is sent in a manner that circumvents the anti-replay protection mechanism of RSP.

Under RSP's anti-replay mechanism, messages include sequence numbers, and the sequence numbers are tracked during a management session for message transmission purpose. If a message is received with a sequence number that is significantly lower than a current highest sequence number received (32 as defined by RSP), the message is rejected. If a message is received with a higher sequence number, the message is always accepted. If the message has the highest permissible sequence number (0xFFFF as defined by RSP), the message is processed, and the management console closes the current management session, and re-opens a new one, which effectively resets the sequence number to 0.

Accordingly, in one embodiment, the anti-replay protection mechanism is circumvented by sending the authenticated message with the largest permissible sequence number under RSP, 0xFFFF.

Therefore, on receipt of the authenticated message with the largest permissible sequence number by managed client 104, the message is processed, and management console 102 causes the management session to be closed and a new management session to be established with the sequence number re-initialized to "0".

Note that the above described circumvention technique advantageously eliminates the need for management console 102 to persistently store and track the sequence number for the purpose of facilitating soft recovery, allowing the present invention to be practiced in a more efficient manner. However, in alternate embodiments, the sequence numbers may be persistently stored and tracked to facilitate continuation of the prior open management session.

Thereafter, the management session creation function continues to complete the "creation" of the management session for the managed client 104 as normal, block 306.

If sufficient amount of time has elapsed since the last transmission of a management message from console side implementation 112 to a client side implementation 122, leading to the time-out and closure of the previous open management session, the message will simply be rejected by the addressed managed client 104, and management console 102 opens a new management session, and resend the message in the new session.

If the addressed managed client 104 has detached from network 106, delivery of the message will simply fail (as it would if the management console has not crashed).

Thus, it can be seen from the above description, a management console equipped to support RMCP (including RSP) with soft crash recovery has been described. While the present invention has been described in terms of the foregoing embodiments, those skilled in the art will recognize that the invention is not limited to these embodiments. The present invention may be practiced with modification and alteration within the spirit and scope of the appended claims. Accordingly, the description is to be regarded as illustrative instead of restrictive on the present invention.

What is claimed is:

1. An apparatus comprising:
   a communication interface to facilitate communication with one or more managed remote clients; and
   a management console operationally coupled to the communication interface, to support a secure remote management protocol for securely managing the remote clients, including management session creation logic to create a management session for secure communication with a managed remote client, with the management session creation logic enhanced to be able to soft recover and re-establish a management session with a managed remote client having a prior open management session after a system failure of the apparatus, where at the time, secure management communication with the managed remote client is possible only under the prior open management session.

2. The apparatus of claim 1, wherein the management session creation logic is designed to determine whether the creation of a management session for a managed remote client is being performed following a system failure of the apparatus, when requested to create a management session for a managed remote client.

3. The apparatus of claim 2, wherein
   the apparatus further comprises non-volatile storage to persistently store data;
   the management session creation logic is designed to persistently store a copy of certain session data of a management session of a managed remote client in said non-volatile storage, on creation of the management session;
   the management console further includes management session termination logic to terminate the management session of the managed remote client, including deleting the persistently stored copy of said certain session data on termination of the management session, and the management session creation logic determines whether a management session creation is being performed for a managed remote client after a system failure of the apparatus by determining whether a copy of said certain session data of a prior open management session of the managed remote client is persistently stored in said non-volatile storage.

4. The apparatus of claim 3, wherein said certain session data being session data required to send an authenticated message to the managed remote client during the management session.

5. The apparatus of claim 1, wherein
the apparatus further comprises non-volatile storage to persistently store data;
the management session creation logic is designed to persistently store a copy of certain session data of a management session of a managed remote client in said non-volatile storage, on creation of the management session, said certain session data being session data required to send an authenticated message to the managed remote client during the management session;
the management console further includes management session termination logic to terminate the management session of the managed remote client, including deletion of the stored persistent copy on termination of the management session; and
the management session creation logic is designed to re-establish a management session for the managed remote client after a system failure of the apparatus by causing an authenticated message to be sent to the managed remote client using said persistently stored certain session data of the prior open management session of the managed remote client.

6. The apparatus of claim 5, wherein the secure remote management protocol includes an anti-replay protection mechanism, and the authenticated message is being sent to the managed remote client in a manner that circumvents the anti-replay protection mechanism.

7. The apparatus of claim 6, wherein said anti-replay protection mechanism circumvention manner of authenticated message sending comprises employing the largest valid sequence number for the message being sent.

8. The apparatus of claim 1, wherein the secure remote management protocol includes an anti-replay protection mechanism, and the management session creation logic is designed to re-establish a management session for the managed remote client after a system failure of the apparatus by causing an authenticated message to be sent to the managed remote client, with the authenticated message being sent in a manner that circumvents the anti-replay protection mechanism.

9. The apparatus of claim 8, wherein said anti-replay protection mechanism circumvention manner of authenticated message sending comprises employing the largest valid sequence number for the message being sent.

10. The apparatus of claim 1, wherein the management session creation logic is designed to store a persistent copy of said certain session data of a management session of a managed remote client required to send an authenticated message to the managed remote client, on creation of the management session, and the management console further includes management session termination logic to terminate the management session of the managed remote client, including deletion of the stored persistent copy on termination of the management session.

11. A method of operation comprising:
receiving, by a management console, a request to create a management session for a managed remote client to facilitate secure communication with the managed remote client;
determining, by the management console, whether the request is being received after a system failure of the management console, with the managed remote client having a prior open management session, and secure communication with the managed remote client is only possible through the prior open management session; and
orchestrating, by the management console, a soft recovery to re-establish a management session for secure communication with the managed remote client.

12. The method of claim 11, wherein
the method further comprises persistently storing, by the management console, a copy of certain session data of a management session of a managed remote client in a non-volatile storage, on creation of the management session, and deleting the persistently stored copy on termination of the management session; and
said determining comprises determining whether a copy of said certain session data of a prior open management session of the managed remote client is persistently stored in said non-volatile storage.

13. The method of claim 12, wherein said certain session data are session data required to send an authenticated message to the managed remote client during the management session.

14. The method of claim 11, wherein
the method further comprises persistently storing, by the management console, a copy of certain session data of a management session of a managed remote client in said non-volatile storage, on creation of the management session, and deleting the stored persistent copy on termination of the management session, said certain session data being session data required to send an authenticated message to the managed remote client during the management session; and
said re-establishing of a management session for the managed remote client comprises sending an authenticated message to the managed remote client using said persistently stored certain session data of the prior open management session of the managed remote client.

15. The method of claim 14, wherein said sending of the authenticated message to the managed remote client is performed in accordance with a secure remote management protocol including an anti-replay protection mechanism, with the authenticated message being sent to the managed remote client in a manner that circumvents the anti-replay protection mechanism.

16. The method of claim 15, wherein said anti-replay protection mechanism circumvention manner of authenticated message sending comprises employing the largest valid sequence number for the message being sent.

17. The method of claim 11, wherein said re-establishing of a management session with the managed remote client comprises sending an authenticated message to the managed remote client in accordance with a secure remote management protocol having an anti-replay protection mechanism, with the authenticated message being sent to the managed remote client in a manner that circumvents the anti-replay protection mechanism.

18. The method of claim 17, wherein said anti-replay protection mechanism circumvention manner of authenticated message sending comprises employing the largest valid sequence number for the message being sent.

19. The method of claim 11, wherein the method further comprises storing, by the management console, a persistent copy of said certain session data of a management session of a managed remote client required to send an authenticated message to the managed remote client, on creation of the management session, and deleting the stored persistent copy on termination of the management session.

20. An article of manufacture comprising:
a recordable medium; and
a plurality of programming instructions recorded thereon, implementing a management console to enable an apparatus to support a secure remote management protocol for securely managing remote clients, including logic to create a management session for secure communication with a managed remote client, with the management session creation logic enhanced to be able to soft recover and re-establish a management session with a managed remote client having a prior open management session, after a system failure of the apparatus, where at the time, secure communication with the managed remote client is possible only under the prior open management session.

21. The article of claim 20, wherein the program instructions are designed to determine whether the creation of a management session for a managed remote client is being performed following a system failure of the apparatus, when requested to create a management session for a managed remote client.

22. The article of claim 20, wherein the program instructions are designed
   (a) to persistently store a copy of certain session data of a management session of a managed remote client in a non-volatile storage, on creation of the management session, and delete the stored persistent copy on termination of the management session, said certain session data being session data required to send an authenticated message to the managed remote client during the management session, and
   (b) to re-establish a management session for the managed remote client after a system failure of the apparatus by causing an authenticated message to be sent to the managed remote client using said persistently stored certain session data of the prior open management session of the managed remote client.

23. The article of claim 20, wherein the program instructions are designed to implement the management console supporting a secure remote management protocol including an anti-replay protection mechanism, and re-establish a management session for the managed remote client after a system failure of the apparatus by causing an authenticated message to be sent to the managed remote client, with the authenticated message being sent in a manner that circumvents the anti-replay protection mechanism.

24. The article of claim 20, wherein the program instructions are designed to store a persistent copy of said certain session data of a management session of a managed remote client required to send an authenticated message to the managed remote client, on creation of the management session, and delete the stored persistent copy on termination of the management session.

25. A system comprising:
a plurality of clients equipped to be managed in accordance with RMCP with RSP; and
a management console coupled to the clients, and equipped to manage the clients in accordance with RMCP with RSP, including management session creation logic equipped to soft recover after a prior system crash of the management console.

26. The system of claim 25, wherein the management session creation logic of the management console is designed to determine whether the creation of a management session for a managed remote client is being performed following a system failure of the management console, when requested to create a management session for a managed remote client.

27. The system of claim 25, wherein
the management session creation logic of the management console is designed to persistently store a copy of certain session data of a management session of a managed remote client in a non-volatile storage, on creation of the management session, said certain session data being session data required to send an authenticated message to the managed remote client during the management session;
the management console further includes management session termination logic to terminate the management session with the managed client, including logic to delete the stored persistent copy on termination of the management session; and
the management session creation logic of the management console is further designed to re-establish a management session for the managed remote client after a system failure of the management console by causing an authenticated message to the managed remote client to be sent using said persistently stored certain session data of the prior open management session of the managed remote client.

28. The system of claim 25, wherein the management console supports a secure remote management protocol including an anti-replay protection mechanism, and the management session creation logic of the management console is designed to re-establish a management session for the managed remote client after a system failure of the management console by causing an authenticated message to be sent to the managed remote client in a manner that circumvents the anti-replay protection mechanism.

29. The system of claim 25, wherein the management session creation logic of the management console is designed to store a persistent copy of said certain session data of a management session of a managed remote client required to send an authenticated message to the managed remote client, on creation of the management session, and the management console further includes management session termination logic that deletes the stored persistent copy on termination of the management session.

* * * * *